(12) United States Patent
Tanaka et al.

(10) Patent No.: US 12,275,215 B2
(45) Date of Patent: Apr. 15, 2025

(54) LIQUID STORAGE MEMBER FOR COATING TOOLS

(71) Applicant: MITSUBISHI PENCIL COMPANY, LIMITED, Tokyo (JP)

(72) Inventors: Saki Tanaka, Shinagawa-ku (JP); Takayuki Yamaguchi, Osaka (JP); Yuichi Inagawa, Chiyoda-ku (JP)

(73) Assignee: MITSUBISHI PENCIL COMPANY, LIMITED, Tokyo (JP)

( * ) Notice: Subject to any disclaimer, the term of this patent is extended or adjusted under 35 U.S.C. 154(b) by 10 days.

(21) Appl. No.: 18/258,945

(22) PCT Filed: Dec. 17, 2021

(86) PCT No.: PCT/JP2021/046777
§ 371 (c)(1),
(2) Date: Jun. 22, 2023

(87) PCT Pub. No.: WO2022/138498
PCT Pub. Date: Jun. 30, 2022

(65) Prior Publication Data
US 2024/0042735 A1    Feb. 8, 2024

(30) Foreign Application Priority Data
Dec. 24, 2020    (JP) .................. 2020-214552

(51) Int. Cl.
*B43K 7/02*        (2006.01)
*B32B 1/08*        (2006.01)
(Continued)

(52) U.S. Cl.
CPC ............... *B32B 15/12* (2013.01); *B32B 1/08* (2013.01); *B32B 7/12* (2013.01); *B32B 15/20* (2013.01);
(Continued)

(58) Field of Classification Search
CPC ... B43K 5/02; B43K 7/02; B43K 7/08; B43K 8/03; B43K 8/146; B43K 8/165
See application file for complete search history.

(56) References Cited

U.S. PATENT DOCUMENTS 11,780,258 B2 * 10/2023 Ichikawa ............... B43K 7/02
                                                      401/222

FOREIGN PATENT DOCUMENTS

CN    108189588 A  *  6/2018
EP    3 613 603 A1     2/2020
(Continued)

OTHER PUBLICATIONS

International Search Report issued Feb. 15, 2022 in PCT/JP2021/046777 filed on Dec. 17, 2021, 2 pages.

*Primary Examiner* — Jennifer C Chiang
(74) *Attorney, Agent, or Firm* — Oblon, McClelland, Maier & Neustadt, L.L.P.

(57) ABSTRACT

A liquid storage includes at least three layers, an inner layer made of paper base material and an intermediate layer of a paper base laminate having a metal layer or a silica vapor deposition layer formed on the outer surface side of the paper-based inner layer, and an outer layer made of paper base material formed on the outer surface side of the intermediate layer. The paper base laminate is wound into a spiral shape and on the outer surface side of the intermediate layer, the outer layer is also wound into a spiral shape. A polyolefin resin-containing adhesive layer lies in between the inner and intermediate layers and/or between the intermediate and outer layers.

14 Claims, 3 Drawing Sheets

(51) Int. Cl.
    *B32B 7/12*          (2006.01)
    *B32B 15/12*        (2006.01)
    *B32B 15/20*        (2006.01)
    *B32B 29/06*        (2006.01)
    *B43K 5/02*          (2006.01)
    *B43K 7/08*          (2006.01)
    *B43K 8/03*          (2006.01)
    *B43K 8/14*          (2006.01)
    *B43K 8/16*          (2006.01)

(52) U.S. Cl.
    CPC ............... *B32B 29/06* (2013.01); *B43K 5/02* (2013.01); *B43K 7/02* (2013.01); *B43K 7/08* (2013.01); *B43K 8/03* (2013.01); *B43K 8/146* (2013.01); *B43K 8/165* (2013.01); *B32B 2255/12* (2013.01); *B32B 2255/26* (2013.01); *B32B 2307/546* (2013.01); *B32B 2307/72* (2013.01); *B32B 2307/7375* (2023.05); *B32B 2597/00* (2013.01)

(56) References Cited

FOREIGN PATENT DOCUMENTS

| | | |
|---|---|---|
| JP | 62-70097 A | 3/1987 |
| JP | 2001-146091 A | 5/2001 |
| JP | 2010-269474 A | 12/2010 |
| JP | 2020-029037 A | 2/2020 |
| WO | WO 2011/073999 A2 | 6/2011 |

\* cited by examiner

LIQUID STORAGE MEMBER FOR COATING TOOLS

TECHNICAL FIELD

The present invention relates to a liquid storage member for coating tools which reduces the environmental impact by using paper base material instead of plastics.

BACKGROUND ART

An ink storage tube for writing tools such as ballpoint pens is put into a shaft pipe of the writing tool, and to the one end (the front end) of the ink storage tube, a ballpoint pen tip or a relay member supporting the ballpoint pen tip which is a writing tool member is pressed and fitted.

For the purpose of ensuring easy shaping and checking easily the amount of ink through the eyes, transparent or translucent plastics such as polypropylene have been conventionally used for such ink storage tubes.

Recently, attention has been focused on the issue of microplastics flowing into the ocean. Momentum for action on global environmental issues, such as refrainment from using single-use plastics, has been growing.

Proposals for plastic reduction have been also made concerning components of a writing tool. PTL 1 discloses a writing tool equipped with a shaft pipe manufactured in the way that a laminated composite material made of barrier synthetic resins or metals such as aluminum is spirally wound on paper base material.

The shaft pipe of this writing tool has the following layered structure to improve water-resistance and gas barrier properties; on the outside of shaft pipe, aluminum foil label paper with kraft paper on the back and liner paper are layered. And polyethylene layer and polyester film with aluminum vapor deposition film outside are layered on the inside of the shaft pipe.

According to this shaft pipe, a writing tool with less pollution can be provided with its content-resistance and durability kept, because of the material comprising the paper base materials.

PTL 2 proposes an aqueous ink storage member with an ink storage tube having multilayer structure of one or more layers of other resin layers inside a storage tube base made of a biodegradable resin.

According to PTL 2, the storage tube base made of a biodegradable resin not only does not swell with an aqueous ink and cause any dimensional change, but also biodegrades over time, which can thereby contribute to reducing the disposal amount of waste.

CITATION LIST

Patent Literature

PTL 1: JP S62-70097 A
PTL 2: JP 2001-146091 A

SUMMARY OF INVENTION

Technical Problem

As described above, products using biodegradable resins and paper base materials can be suitable for less pollution. Especially, it is assumed that environment-friendly products as alternative materials for plastics can be provided by using materials including pulp and paper as base materials.

According to the above viewpoint, the present invention has been carried out to reduce plastics by substituting the liquid (e.g., ink) storage tubes made of plastics such as polypropylene with those made of paper base materials.

Solution to Problem

The liquid storage member for coating tools of the present invention has at least three layers of: a paper base laminate composed of an inner layer made of paper base material and an intermediate layer being a metal layer or a silica vapor deposition layer formed on the outer surface side of the inner layer; and an outer layer made of the paper base material formed on the outer surface side of the intermediate layer. The liquid storage member for coating tools has structures in which the paper base laminate is spirally wound and the outer layer made of the paper base material is spirally wound around the outer surface side of the intermediate layer. A polyolefin resin-containing adhesive layer lies in between the inner layer and the intermediate layer and/or between the intermediate layer and the outer layer.

The paper base laminate preferably has a length of 4 to 20 mm in the width direction.

The paper base material of the inner layer preferably has a density of 0.8 g/cm$^3$ or more.

Preferably, the paper base material of the inner layer is glassine paper, parchment paper, or vulcanized fiber.

The liquid storage member for coating tools preferably has the following structure in the lengthwise direction: the paper base laminate is spirally wound for the adjacent portions to come into contact but not to be overlapped with each other, and the outer layer made of the paper base material is spirally wound for the adjacent portions to come into contact with each other.

The liquid storage member for coating tools preferably has two or more of the paper base laminates.

The contact portion of the paper base laminate and the contact portion of the outer layer made of the paper base material are preferably arranged apart from each other by 1 mm or more and a half or less of the width of the paper base laminate or the outer layer made of the paper base material in the lengthwise direction of the liquid storage member for coating tools.

Preferably, the liquid storage member for coating tools is a paper refill for a writing tool.

Advantageous Effects of Invention

In the present invention, the inner layer and the intermediate layer and/or the intermediate layer and the outer layer of the paper base laminate are bonded with a polyolefin resin-containing adhesive or other adhesives containing the polyolefin resin and another resin, which makes the layers adhere to each other and prevents ink from leaking out of the liquid storage member for coating tools. In order to suppress ink leakage, it is effective to leave more spaces between seams 4 of each paper base laminate and between seams 4' of each outer layer using a wider paper base laminate.

The present invention can provide a liquid storage member for coating tools which successfully reduces plastic consumption and reduces the environmental impact.

BRIEF DESCRIPTION OF DRAWINGS

FIG. 1a shows a front view of an appearance of the refill and FIG. 1b shows a cross section along line A-A of the refill.

FIG. 2 shows a three-layer structure of an inner layer, an intermediate layer and an outer layer constituting the liquid storage member for coating tools of the present invention: a form (2a) of an inner layer and an intermediate layer with an adhesive layer in-between, a form (2b) of an intermediate layer and an outer layer with an adhesive layer in-between, and a form (2c) of an inner layer, an intermediate layer and an outer layer each with adhesive layers in-between.

FIG. 3 shows a multilayer structure of a paper base laminate constituting the liquid storage member for coating tools of the present invention: a form (3a) of a multilayer structure of [a paper base laminate (an inner layer 1+an adhesive layer 5+an intermediate layer 2), an adhesive layer 5, an inner layer 1, an adhesive layer 5, an inner layer 1, an adhesive layer 5, a paper base laminate (an intermediate layer 2+an adhesive layer 5+an inner layer 1), an adhesive layer 5, an outer layer 3, an adhesive layer 5 and an outer layer 3], or a form (3b) of a multilayer structure of [a paper base laminate (an inner layer 1+an adhesive layer 5+an intermediate layer 2), an adhesive layer 5, a paper base laminate (an inner layer 1+an adhesive layer 5+an intermediate layer 2), an adhesive layer 5, an outer layer 3, an adhesive layer 5 and an outer layer 3].

DESCRIPTION OF EMBODIMENTS

The liquid storage member for coating tools of the present invention will be described in detail referring to the drawings.

Figure 1:
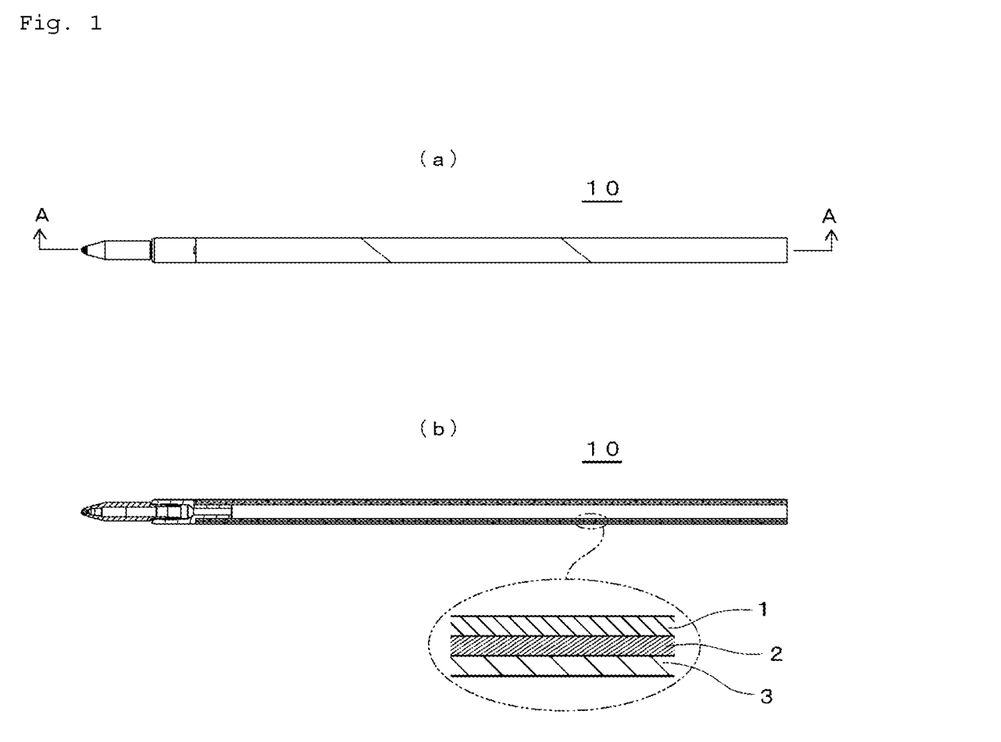
FIG. 1 shows an example of configuration for a refill including liquid storage member for coating tools of the present invention.

FIG. 1 shows an example of configuration for a refill including the liquid storage member 10 for coating tools of the present invention. FIG. 1a shows a front view of an appearance of the refill and FIG. 1b shows a cross section along line A-A of the refill.

In FIG. 1, for example, a refill put in a barrel of a ballpoint pen is composed of a liquid storage member for coating tools 10 (hereinafter also referred to simply as the "liquid storage member 10") which is a paper-based long thin cylindrical ink storage tube to store ink (not shown); a joint 11 fixed to the end of the liquid storage member 10; and a ballpoint pen tip 12 fixed to the end of the joint 11 as a member for the writing tool.

To be specific, the joint 11 has a cylindrical rear end part which joints the liquid storage member 10 and a cylindrical tip part having larger outer diameter than the rear end part. A ballpoint pen tip 12 is installed in this tip part. An adhesive is applied to the rear end part of the joint 11 in advance so as to stick the joining part of the liquid storage member 10 together. In these circumstances, the rear end part of the joint 11 is pressed to the inside of the tip part of the liquid storage member 10 to connect the joint 11 to the liquid storage member 10. Thereby the liquid storage member 10 is connected with the ballpoint pen tip 12 so as to flow ink through the joint 11.

The liquid storage member 10 has at least three layers: the paper base laminate composed of the inner layer 1 made of paper base material and the intermediate layer 2 being a metal layer or a silica vapor deposition layer formed on the outer surface side of the inner layer 1; and the outer layer 3 made of the paper base material formed on the outer surface side of the intermediate layer 2. The liquid storage member 10 has a structure in which the paper base laminate is wound into a spiral shape so that the inner layer 1 could be inside, and a structure in which the outer layer made of the paper base material is wound into a spiral shape around the outer surface side of the intermediate layer 2. The liquid storage member 10 has a polyolefin resin-containing adhesive layer between the inner layer 1 and the intermediate layer 2 and/or between the intermediate layer 2 and the outer layer 3.

The liquid storage member 10 has at least three layers composed of the inner layer 1 on contact with liquid, the intermediate layer 2, and the outer layer 3; and the polyolefin resin-containing adhesive layer 5 (hereinafter referred to simply as the "adhesive layer 5") between the inner layer 1 and the intermediate layer 2 and/or between the intermediate layer 2 and the outer layer 3. FIG. 2c shows a form having adhesive layers 5 both between an inner layer 1 and an intermediate layer 2 and between an intermediate layer 2 and an outer layer 3. Among such three layers, the inner layer 1 and the intermediate layer 2 constitute the paper base laminate, in other words, a laminated composite material in which the metal layer or the silica vapor deposition layer is formed on the surface of the paper base materials. As described above, the adhesive layer 5 may exist between the paper base laminate.

Materials of the inner layer 1 can include various known paper base materials, such as fine quality paper, medium quality paper, glazed paper, kraft paper, machine-glazed kraft paper, bleached kraft paper, cardboard, white paper board, liner, fine coating paper, coated paper, art paper, cast-coated paper, glassine paper, parchment paper and vulcanized fiber.

A density of 0.8 $g/cm^3$ or more is favorable to the foregoing paper base materials, because of imparting satisfactory water-resistance and oil-resistance.

Preferably, the paper base material constituting the inner layer 1 is glassine paper, parchment paper, or vulcanized fiber and has a density of 0.8 $g/cm^3$ or more.

Glassine paper, which is highly dense and transparent paper, is prepared by beating virgin pulp most strongly to enlarge the specific surface area and supercalendering the paper made therefrom for densification and reinforcement of interfiber bonding of cellulose. The glassine paper with a basis weight of 20 to 50 $g/m^2$ is used in the present invention. Water-resistance and oil-resistance are easily imparted by using the glassine paper as the paper base material constituting the inner layer 1. Coating liquids such as a polyvinyl alcohol aqueous solution may be applied to either one or both sides of glassine paper with a basis weight of 20 to 50 $g/m^2$ as a base paper. The glassine paper ordinarily has a thickness of 20 to 50 µm, and 20 to 30 µm preferably.

Parchment paper and vulcanized fiber are the products of direct interfiber bonding between cellulose reinforced by treatment with concentrated sulfuric acid and a solution of zinc chloride, that is, the products with increased density of hydrogen bonding between cellulose fibers. Therefore, the use of parchment paper and vulcanized fiber as the paper base material constituting the inner layer 1 can effectively restrain the paper dust from generating.

For example, parchment paper with a basis weight of 20 to 100 $g/m^2$ may be used, and preferably, oil-resistance may be enhanced for the parchment paper to have an oil absorbency of 13 $g/m^2$ or less in accordance with Testing Method for Water Absorptiveness of Paper and Paperboard (Cobb method), though mineral oil is used instead of water here. The parchment paper usually has a thickness of 20 to 100 µm, and 20 to 60 µm preferably.

Vulcanized fiber can be thickened more easily than parchment paper because of the difference of reactivity in the manufacturing process. Therefore, the vulcanized fiber is appropriate when thicker paper base material is required. The vulcanized fiber ordinarily has a thickness of 0.08 to 1 mm, but considering the compressive strength of the paper tube part of the liquid storage member 10 after it is formed and the easy handling during the production, a thickness of 0.1 to 0.5 mm is preferable. The vulcanized fiber is denser than generally used paper-tube base papers and the density is usually 0.8 to 1.4 g/cm$^3$. In the present invention, 0.8 to 1.3 g/cm$^3$ is favorable, considering the strength of the paper tube part and the availability.

Parchment paper and vulcanized fiber may be impregnated with resin or coated with glass. Such treatments make the bonding of cellulose fibers stronger, and the generation of paper dust can be suppressed when these papers are used as paper base material constituting the inner layer 1.

The intermediate layer 2 is a metal layer or a silica vapor deposition layer. The metal layer may be prepared by adhering metal foil such as aluminum foil to one side of the paper base material with a polyolefin resin-containing adhesive, or by depositing aluminum, an alloy of aluminum and zinc, etc., with electron beam in a vacuum.

Herein, the polyolefin resin-containing adhesive used in the present invention is described. The polyolefin resin-containing adhesives may comprise one or more polyolefin resins or may be a mixture of one or more polyolefin resins with the other resins.

Specific examples of the polyolefin resin include modified polyolefin resins such as maleic anhydride-modified polypropylene besides polyethylene ionomer, polypropylene ionomer, polypropylene elastomer, polyethylene elastomer, high density polyethylene and low density polyethylene. Among these, polypropylene ionomer and maleic anhydride-modified polypropylene are preferable.

Specific examples of the other resins include acrylic acid copolymer, ethylene-vinyl alcohol copolymer (EVOH), ethylene-acrylic acid copolymer (EAA), ethylene-methacrylic acid copolymer (EMAA), epoxy resin, a carbodiimide crosslinking agent, ethylene-vinyl acetate copolymer and polyvinyl alcohol.

When the polyolefin resin is mixed with the other resins, the proportion of the polyolefin resin in the whole adhesive is approximately 60 to 97 wt % and preferably 90 to 97 wt %. The proportion of the polyolefin resin in the total of the polyolefin resin and the other resins is approximately 68 to 98 wt % and preferably 93 to 98 wt %.

The polyolefin resin-containing adhesive of the present invention is used in the form of dispersed or emulsified resin liquid based on polyolefin resins or a mixture of the polyolefin resins and the other resins. When necessary, additives such as a silane coupling agent can be added to the resin liquid. Among these, because of their excellent adhesion and handleability, dispersed adhesives, such as polypropylene ionomer and maleic anhydride-modified polypropylene are preferable.

Figure 2:
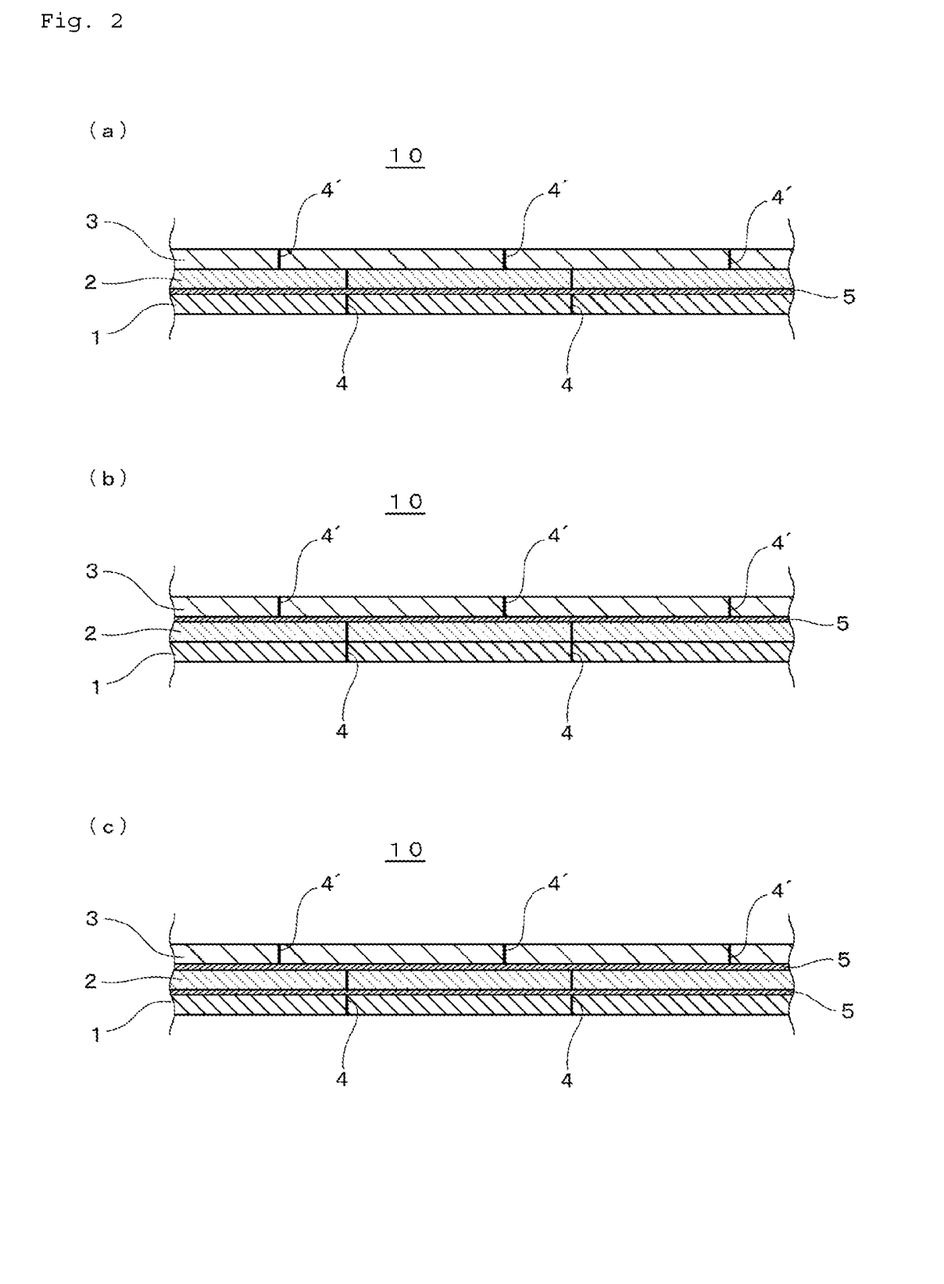

The polyolefin resin-containing adhesive is applied between the inner layer 1 and the intermediate layer 2 and/or between the intermediate layer 2 and the outer layer 3. As shown in FIG. 2, the adhesive layer 5 can be placed between the inner layer 1 and the intermediate layer 2 (FIG. 2*a*), between the intermediate layer 2 and the outer layer 3 (FIG. 2*b*), or between the inner layer 1, the intermediate layer 2 and the outer layer 3 (FIG. 2*c*). The application of the polyolefin resin-containing adhesive excellent in adhesion and ink-resistance to paper materials makes the inner layer 1, the intermediate layer 2 and the outer layer 3 adhere closely to each other, which thereby effectively prevents ink from leaking out of the liquid storage member 10. Herein, the ink-resistance stands for to what extent resin components in an adhesive can be prevented from being dissolved in an ink. Insufficient ink-resistance causes a decrease in strength and an increase in volatile loss of a refill. The ink leakage causes a poor appearance of the refill. The use of the polyolefin resin-containing adhesive shows the possibility of improving the ink-resistance, because of its low compatibility with ink and preventability of the polyolefin resin from dissolving into the ink.

In the present invention, the polyolefin resin-containing adhesive has only to bond at least one pair of layers among the inner layer 1, the intermediate layer 2 and the outer layer 3. The other adhesives, e.g., general-purpose adhesives, such as vinyl acetate resin type, acrylic resin type and polyvinyl alcohol can be simultaneously used.

The polyolefin resin-containing adhesive is heaped up in the center of the inner layer 1 or the intermediate layer 2. Next, the inner layer 1 and the intermediate layer 2 being pressed each other, the adhesive is spread over the entire adhesion surface, and both layers are bonded so that neither bubbles nor adhesion failure will remain in the bonded portion. The inner layer 1 and the intermediate layer 2, bonded together, are pressed and fixed until the adhesive gets stiffened.

The polyolefin resin-containing adhesive is applied to the inner layer 1 or the intermediate layer 2 in an amount of approximately 5 to 50 g/m$^2$ and preferably 5 to 25 g/m$^2$.

In the liquid storage member 10, the inner layer 1 and the intermediate layer 2 may be composed of the paper base laminates prepared from paper base material and a metal layer or a silica vapor deposition, all of which are of the same thickness, but each layer which has a different thickness may be used suitably in various combination.

The paper base laminate is composed of the paper base material and the metal layer or silica vapor deposition layer with a thickness ratio of approximately 2/1 to 1200/1.

The intermediate layer 2 adhering to the inner layer 1 is cut out to a width of 4 to 20 mm with a bobbin slitter machine to give a band-shaped paper base laminate. Next, this paper base laminate is wound around the mandrel of a paper tube manufacturing machine into a spiral shape so as to make the inner layer 1 inside. Besides, the mandrel needs to have a surface pretreated with an appropriate lubricant in advance so as to pull it out easily after the inner layer 1, the intermediate layer 2 and the outer layer 3 are formed; or alternatively, a moderate amount of lubricant may be applied to the inside of the inner layer 1 (paper base material) to be in contact with the mandrel. Then, an adhesive e.g., the polyolefin resin-containing adhesive is applied to the outside surface of the intermediate layer 2 to bond the outer layer 5 together.

It is preferable that the paper base laminate have a band-shaped sheet with a width of 4 to 20 mm, and a width of 5 to 15 mm is far preferable. By winding this wide paper base laminate around the mandrel into a spiral shape, the desired length of liquid storage member 10 can be easily obtained even without many winding turns. As a result, the contact area of the paper base laminate, i.e., the number of seams 4 can be reduced, which successfully prevents liquid contained in the liquid storage member 10 from leaking.

The paper base material is spirally wound around the outer surface side of the intermediate layer 2 and forms the outer layer 3. It is also preferable that the outer layer 3 be made of the paper base material with 4 to 20 mm in width, specifically 6 to 15 mm in width. Like the paper base laminate, reducing the number of seams 4' prevents liquid in the liquid storage member 10 from leaking.

The paper base material constituting the inner layer 1 can be used as the paper base material constituting the outer layer 3. The outer layer 3 can be stuck on the intermediate layer 2 with the polyolefin resin-containing adhesive. The way of applying the polyolefin resin-containing adhesive and the application amount are almost the same as those used for the inner layer 1 and the intermediate layer 2.

Each thickness (μm) ratio of the inner layer 1, the intermediate layer 2 and the outer layer 3 is usually 20 to 60:0.025 to 12:50 to 200, and preferably 20 to 30:0.025 to 12:50 to 200.

Figure 3:
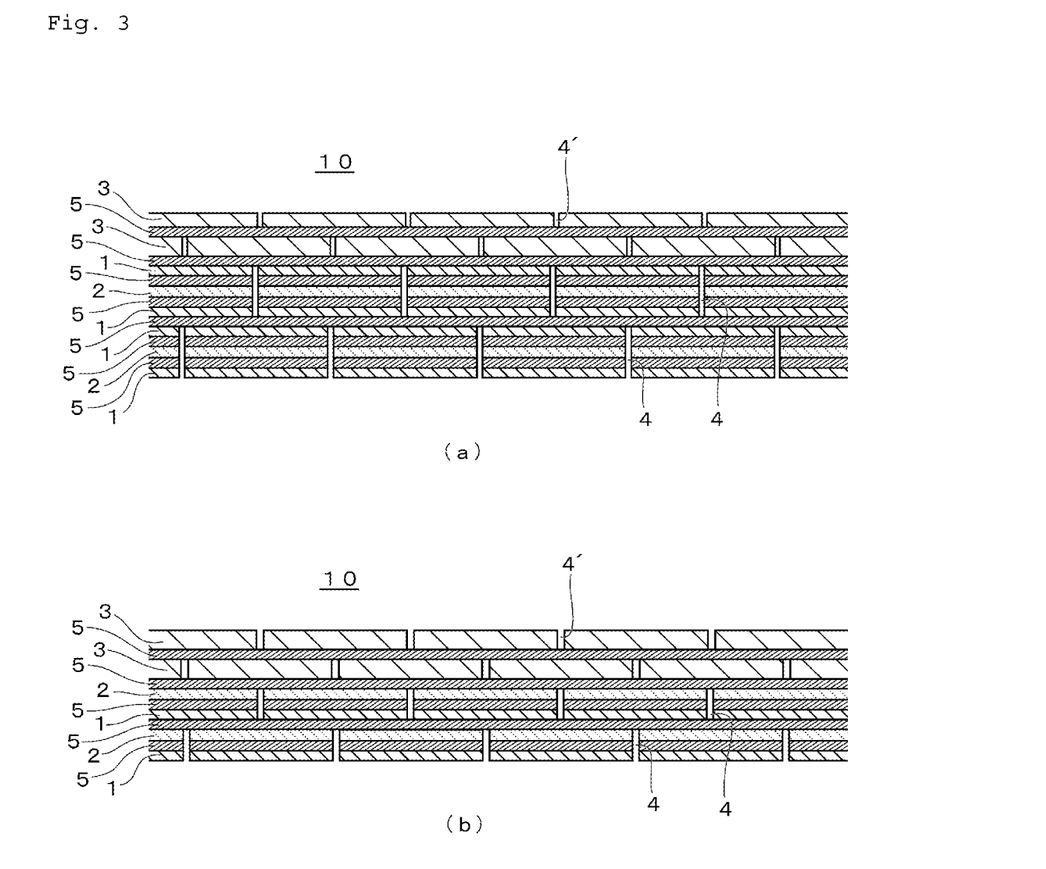

Depending on types and thickness of paper base material, an additional inner layer 1 can be inserted between the intermediate layer 2 and the outer layer 3 as shown in FIG. 3. Even in this case, the intermediate layer 2 and inner layer 1, or the inner layer 1 and outer layer 3 can be bonded with the polyolefin resin-containing adhesive.

There may exist two or more of the paper base laminates. As shown in FIG. 3, for example, a liquid storage member 10 may have a structure (3a) of a paper base laminate (an inner layer 1+an adhesive layer 5+an intermediate layer 2), an adhesive layer 5, an inner layer 1, an adhesive layer 5, an inner layer 1, an adhesive layer 5, a paper base laminate (an intermediate layer 2+an adhesive layer 5+an inner layer 1), an adhesive layer 5, an outer layer 3, an adhesive layer 5 and an outer layer 3; or a structure (3b) of a paper base laminate (an inner layer 1+an adhesive layer 5+an intermediate layer 2), an adhesive layer 5, a paper base laminate (an inner layer 1+an adhesive layer 5+an intermediate layer 2), an adhesive layer 5, an outer layer 3, an adhesive layer 5 and an outer layer 3. In the foregoing multilayer structures, the proportion of thicknesses (μm) of the inner layer 1, the intermediate layer 2 and the outer layer 3 may be the same likewise the three-layer structure composed of an inner layer 1, an intermediate layer 2 and an outer layer 3. In the case of multilayer structure consisting of two sets or more of the inner layer 1, the intermediate layer 2 and the outer layer 3, thickness of each layer can be different. The liquid storage member 10 having such a multilayer structure is a preferred embodiment from the viewpoint of preventing ink leakage and volatilization.

As mentioned above, the liquid storage member 10 preferably has a structure in which the paper base laminates are arranged into a spiral shape so that their adjacent portions come in contact but are not overlapped with each other in the lengthwise direction of the liquid storage member 10. Even though the adjacent portions are overlapped at the contact portion of the paper base laminate, that is, seam 4, the overlap should be at most 1 mm wide. When one seam 4 is in contact with the other seam 4 so as not to be overlapped with each other, or when the overlap is at most 1 mm wide, liquid leakage from the seam 4 is suppressed. When the overlap at the seam 4 is larger than a width of 1 mm, the level difference at the overlapped portion may cause liquid leakage.

As with the paper base laminate, the outer layer 3 is preferably wound so that the adjacent portions come into contact with each other. A seam 4' of the outer layer 3 and a seam 4 of the paper base laminate are preferably spaced by 1 mm or more, and spaced by a half or less of the width of the paper base laminate or the outer layer 3 in the lengthwise direction of the liquid storage member for coating tools. The seam 4' and the seam 4 are preferably spaced by 3 mm or more, and spaced by a half or less of the width of the paper base laminate or the outer layer 3. Even though the seams 4' of the outer layer 3 are slightly overlapped, there is no trouble of liquid leakage.

The liquid storage member 10 manufactured as described above is completed by pulling out the mandrel after the inner layer 1, the intermediate layer 2 and the outer layer 3 are formed, cutting a cylindrically formed body to have a certain length necessary for the liquid storage member 10 for coating tools, and drying it for a few hours under conditions of moderate temperature and humidity.

The liquid storage member 10 is smaller in diameter than normal paper tubes. The outside diameter is usually 20 mm or less, preferably 15 mm or less, and far preferably 10 mm or less. The lower limit of the outside diameter is usually 1 mm or more and preferably 2 mm or more. The liquid storage member of such a small diameter demands strict dimensional accuracy. As the outside diameter of the liquid storage member 10 becomes smaller, it is preferable that the paper base laminate be wound for the adjacent portions to come into contact but not to be overlapped with each other, and that the outer layer made of the paper base material be wound for the adjacent portions to have contact with each other, when the paper base laminate and the outer layer made of the paper base material are wound into a spiral shape.

The liquid storage member 10 usually has a thickness of 0.07 to 0.6 mm, to be specific, 0.2 to 0.4 mm. In the above range of thickness, the liquid storage member 10 can hold a sufficient amount of liquid, which can improve barrier properties and restrain the liquid spill and deterioration easily.

The liquid storage member 10 has definite limitations in size, because it is loaded into a coating tool. The widest cross section is 1 to 20 mm in length, to be specific, 3 to 10 mm in length.

The coating tool of the present invention is not restricted only if equipped with the liquid storage member 10. The coating tool may be available for both wadding-type writing tools and direct liquid-type ones, and also may be appropriate for cosmetic tools, such as eyeliner, mascara and concealer.

As far as writing tools are concerned, the nib may include a brush, a soft brush, and a pen of any kind. To be more specific, the writing tool includes a fountain pen, a ballpoint pen, a marking pen, a felt pen, a whiteout, and a brush pen. Ink put into the liquid storage member 10 may be either a water-based (gel) ink or an oil-based ink. Considering various uses of pens, inks for ballpoint pens, pressurized ballpoint pens, and marking pens are included.

When the coating tool is a writing tool and the liquid storage member 10 is a paper refill for a writing tool, the present invention exerts favorable and meaningful effects.

EXAMPLES

Example 1

Manufacture of the Liquid Storage Member for Coating Tools

Glassine paper having a thickness of 25 μm (basis weight: 25 g/m$^2$ and density: 1.0 g/cm$^3$) was stuck on a 6.5 μm-thick aluminum foil with a polyolefin resin-containing adhesive CHEMIPEARL S500 (manufactured by Mitsui Chemicals, Inc.) to produce pasted paper. The pasted paper with the 6.5 μm-thick adhesive layer had a total thickness of 38 μm. The pasted paper was cut out to a width of 13 mm with a bobbin slitter machine.

To the aluminum foil side of the outer layer of the band-shaped pasted paper, 12 g/m$^2$ of the polyolefin resin-containing adhesive was applied, and the obtained product was spirally wound around the outer surface side of the mandrel of a paper tube manufacturing machine (Langston) so as to make a single spirally shaped layer having the glassine paper inside.

Next, 66 μm-thick coated paper (basis weight: 85 g/m$^2$) which was cut out to a width of 13 mm with a bobbin slitter machine was spirally wound around the aluminum foil side of the outer layer of the pasted paper to make a single layer.

It should be noted that the pasted paper and the coated paper were each wound so as to butt each other at the adjacent portion in a manner not to be overlapped. The contact portion of the pasted paper and that of the coated papers were arranged apart from each other by 3 mm in the lengthwise direction.

The spiral tube thus obtained was cut in a length of 89.3 mm to give a liquid storage member with an inner diameter of 3.8 mm for coating tools. The above liquid storage member was expressed as a paper tube 1.

Evaluation of the Liquid Storage Member for Coating Tools (1) Measurement of Volatile Loss The obtained paper tube 1 was filled with 0.7 g of a coating liquid 1 prepared as prescribed below, and then filled with polybutene to a length of approximately 10 mm to seal the rear end of the coating liquid.

| <Coating liquid 1> | (Total amount: 100 wt %) |
|---|---|
| Spiron Violet C-RH [manufactured by Hodogaya Chemical Co., Ltd.] | 8% |
| Spiron Yellow C-GNH [manufactured by Hodogaya Chemical Co., Ltd.] | 5% |
| Printex #35 [manufactured by Degussa Japan Co., Ltd.] | 8% |
| Polyvinyl butyral BL-1 [manufactured by Sekisui Chemical Co., Ltd.] | 4% |
| Polyvinyl butyral BH-3 [manufactured by Sekisui Chemical Co., Ltd.] | 0.7% |
| Hilac 110H [manufactured by Hitachi Chemical Co., Ltd.] | 10% |
| Solsperse 28000 [manufactured by The Lubrizol Corporation] (acid value: 29, weight-average molecular weight: ca. 3400) | 1% |
| benzotriazole | 0.5% |
| 3-methoxy-3-methyl-1-butanol | 62.8% |

Next, a stainless steel stopper was press-fitted into the end part of the liquid storage member which was opposite to the sealing part above described. The paper tube 1 with both ends closed was left settled horizontally for 10 days in an environment of 10% relative humidity (RH) at 50° C. The volatile loss (%) was obtained from the reduction amount of the coating liquid.

The volatile loss of the paper tube 1 was 0.51%.

(2) Bending Test

A wedge-type bending jig was pressed to the center of paper tube 1 at a rate of 30 mm/min under the condition of an inter-fulcrum distance of 75 mm. The value determined at buckling was regarded as the bending strength.

The bending strength of the paper tube 1 was 1.6 N.

(3) Ink Leakage Test

A paper tube 1 filled with a coating liquid 1 was kept upside down for 4 weeks at 50° C.

Ink leakage was observed through the eyes by the following evaluation standard.

A: No ink leakage is detected.
B: A slight amount of ink leakage is present.
C: A significant amount of ink leakage is occurring.

No ink leakage was observed when the paper tube 1 was used. The result of ink leakage test was A.

Comparative Example 1

Manufacture of the Liquid Storage Member for Coating Tools

A liquid storage member was manufactured in a manner similar to Example 1, except that acrylic acid copolymer (987B, manufactured by Japan Coating Resin Corporation) was used as an adhesive in place of CHEMIPEARL S500. The above liquid storage member was expressed as a paper tube 9.

Evaluation of the Liquid Storage Member for Coating Tools

The measurement of the volatile loss, the bending test and the ink leakage test were carried out in a manner similar to Example 1.

The paper tube 9 had a bending strength of 1.5 N and a result of ink leakage test of B. Since the coating liquid 1 exuded from the paper tube 9, the measurement of volatile loss was meaningless and unmeasurable. The results are shown in Table 1.

Comparative Example 2

Manufacture of the Liquid Storage Member for Coating Tools

A liquid storage member was manufactured in a manner similar to Example 1, except that ethylene-vinyl acetate copolymer (EVA AD-92, manufactured by Showa Denko K.K.) was used as an adhesive in place of CHEMIPEARL S500. The above liquid storage member was expressed as a paper tube 10.

Evaluation of the Liquid Storage Member for Coating Tools

The measurement of the volatile loss, the bending test and the ink leakage test were carried out in a manner similar to Example 1.

The paper tube 10 had a bending strength of 1.2 N and a result of ink leakage test of C. Since the coating liquid 1 exuded from the paper tube 10, the measurement of volatile loss was unmeasurable. The results are shown in Table 1.

Comparative Example 3

Manufacture of the Liquid Storage Member for Coating Tools

A liquid storage member was manufactured in a manner similar to Example 1, except that vinyl acetate resin (AX-428, manufactured by Showa Denko K.K.) was used as an adhesive in place of CHEMIPEARL S500. The above liquid storage member was expressed as a paper tube 11.

Evaluation of the Liquid Storage Member for Coating Tools

The measurement of the volatile loss, the bending test and the ink leakage test were carried out in a manner similar to Example 1.

The paper tube 11 had a bending strength of 1 N and a result of ink leakage test of C. Since the coating liquid 1 exuded from the paper tube 11, the measurement of volatile loss was unmeasurable. The results are shown in Table 1.

Example 2

Manufacture of the Liquid Storage Member for Coating Tools

A liquid storage member was manufactured in a manner similar to Example 1, except that the band-shaped pasted papers were spirally wound twofold around the outer surface side of the mandrel of the paper tube manufacturing machine (Langston), which did not become single- but double-layered. The liquid storage member was expressed as a paper tube 2.

Evaluation of the Liquid Storage Member for Coating Tools

The obtained paper tube 2 was filled with coating liquid 1, the end of which was sealed with polybutene. The measurement of the volatile loss, the bending test and the ink leakage test were carried out in a manner similar to Example 1.

The paper tube 2 had a volatile loss of 0.26%, a bending strength of 2.5 N and a result of ink leakage test of A. The results are shown in Table 1.

Comparative Example 4

Manufacture of the Liquid Storage Member for Coating Tools

A liquid storage member was manufactured in a manner similar to Example 2, except that acrylic acid copolymer (987B, manufactured by Japan Coating Resin Corporation) was used as an adhesive in place of CHEMIPEARL S500. The above liquid storage member was expressed as a paper tube 12.

Evaluation of the Liquid Storage Member for Coating Tools

The obtained paper tube 12 was filled with coating liquid 1, the end of which was sealed with polybutene. The measurement of the volatile loss, the bending test and the ink leakage test were carried out in a manner similar to Example 1.

The paper tube 12 had a bending strength of 2 N and a result of ink leakage test of A, but a volatile loss was as much as 2.89%.

Comparative Example 5

Manufacture of the Liquid Storage Member for Coating Tools

A liquid storage member was manufactured in a manner similar to Example 2, except that ethylene-vinyl acetate copolymer (EVA AD-92, manufactured by Showa Denko K.K.) was used as an adhesive in place of CHEMIPEARL S500. The above liquid storage member was expressed as a paper tube 13.

Evaluation of the Liquid Storage Member for Coating Tools

The obtained paper tube 13 was filled with coating liquid 1, the end of which was sealed with polybutene. The measurement of the volatile loss, the bending test and the ink leakage test were carried out in a manner similar to Example 1.

The paper tube 13 had a bending strength of 1.9 N. While the result of ink leakage test was B, the measurement of volatile loss was unmeasurable because the coating liquid 1 exuded from the paper tube 13. The results are shown in Table 1.

Comparative Example 6

Manufacture of the Liquid Storage Member for Coating Tools

A liquid storage member was manufactured in a manner similar to Example 2, except that vinyl acetate resin (AX-428, manufactured by Showa Denko K.K.) was used as an adhesive in place of CHEMIPEARL S500. The above liquid storage member was expressed as a paper tube 14.

Evaluation of the Liquid Storage Member for Coating Tools

The obtained paper tube 14 was filled with coating liquid 1, the end of which was sealed with polybutene. The measurement of the volatile loss, the bending test and the ink leakage test were carried out in a manner similar to Example 1.

The paper tube 14 had a bending strength of 1.8 N and a result of ink leakage test of B. Since the coating liquid 1 exuded from the paper tube 14, the measurement of volatile loss was unmeasurable. The results are shown in Table 1.

TABLE 1

|  | Ex. 1 | Comp. Ex. 1 | Comp. Ex. 2 | Comp. Ex. 3 | Ex. 2 | Comp. Ex. 4 | Comp. Ex. 5 | Comp. Ex. 6 |
| --- | --- | --- | --- | --- | --- | --- | --- | --- |
| Paper Tube | 1 | 9 | 10 | 11 | 2 | 12 | 13 | 14 |
| Coating Liquid | 1 | 1 | 1 | 1 | 1 | 1 | 1 | 1 |
| Volatile Loss (%) | 0.51 | — | — | — | 0.26 | 2.89 | — | — |
| Bending Strength (N) | 1.6 | 1.5 | 1.2 | 1 | 2.5 | 2 | 1.9 | 1.8 |
| Ink Leakage | A | B | C | C | A | A | B | B |

Example 3

Manufacture of the Liquid Storage Member for Coating Tools

A liquid storage member was manufactured in a manner similar to Example 1, except that the band-shaped pasted papers were spirally wound twofold around the outer surface side of the mandrel of the paper tube manufacturing machine (Langston), which did not become single- but double-layered. The liquid storage member was expressed as a paper tube 3.

Evaluation of the Liquid Storage Member for Coating Tools

The measurement of the volatile loss, the bending test and the ink leakage test were carried out in a manner similar to Example 1, except that the paper tube 3 was filled with coating liquid 2 in place of coating liquid 1. Coating liquid 2 was prepared as prescribed below.

| <Coating liquid 2> | (Total amount: 100 wt %) |
|---|---|
| Fuji Red 2510 [manufactured by Fuji Pigment Co., Ltd.] | 8% |
| Joncryl 61J [manufactured by BASF Japan Ltd.] | 6% |
| xanthan gum Kelsan S [manufactured by Sansho Co., Ltd.] | 0.32% |
| isopropyl phosphate | 0.5% |
| Bioden 421 [manufactured by Nippon Soda CO., LTD.] | 0.2% |
| benzotriazole | 0.3% |
| triethanolamine | 1.4% |
| propylene glycol | 15% |
| ion exchanged water | 68.28% |

The paper tube 3 had a volatile loss of 5.59%, a bending strength of 2.5 N and a result of ink leakage test of A. The results are shown in Table 2.

Example 4

Manufacture of the Liquid Storage Member for Coating Tools

A liquid storage member was manufactured in a manner similar to Example 1, except that the band-shaped pasted papers were spirally wound twofold around the outer surface side of the mandrel of the paper tube manufacturing machine (Langston), which did not become single- but double-layered. The liquid storage member was expressed as a paper tube 4.

Evaluation of the Liquid Storage Member for Coating Tools

The measurement of the volatile loss, the bending test and the ink leakage test were carried out in a manner similar to Example 1, except that the paper tube 4 was filled with coating liquid 3 in place of coating liquid 1. Coating liquid 3 was prepared as prescribed below.

| <Coating liquid 3> | | (Total amount: 100 wt %) |
|---|---|---|
| Vinyblan GV5651 [manufactured by Nissin Chemical Industry Co., Ltd.] (poly(vinyl acetate) emulsion; solid content 40%) | | 80% |
| Acid dye | Red No. 227 | 0.22% |
|  | Yellow No. 4 | 0.34% |
|  | Blue No. 1 | 0.08% |
| Purified water | | 19.36% |

The paper tube 4 had a volatile loss of 4.16%, a bending strength of 2.5 N and a result of ink leakage test of A. The results are shown in Table 2.

Example 5

Manufacture of the Liquid Storage Member for Coating Tools

A liquid storage member was manufactured in a manner similar to Example 2, except that pasted paper prepared by sticking a 25 μm-thick parchment paper (basis weight: 25 g/m$^2$ and density: 1.0 g/cm$^3$) on a 6.5 μm-thick aluminum foil with a polyolefin resin-containing adhesive was used instead of glassine paper. The liquid storage member was expressed as a paper tube 5.

Evaluation of the Liquid Storage Member for Coating Tools

The measurement of the volatile loss, the bending test and the ink leakage test were carried out in a manner similar to Example 1.

The paper tube 5 had a volatile loss of 0.42%, a bending strength of 2.2 N and a result of ink leakage test of A. The results are shown in Table 2.

Example 6

Manufacture of the Liquid Storage Member for Coating Tools

A liquid storage member was manufactured in a manner similar to Example 2, except that pasted paper having not aluminum foil but a 0.4 μm-thick silica vapor deposition layer on a 25 μm-thick glassine paper (basis weight: 25 g/m$^2$ and density: 1.0 g/cm$^3$) was used. The liquid storage member was expressed as a paper tube 6.

Evaluation of the Liquid Storage Member for Coating Tools

The measurement of the volatile loss, the bending test and the ink leakage test were carried out in a manner similar to Example 1.

The paper tube 6 had a volatile loss of 0.79%, a bending strength of 2.2 N, and a result of ink leakage test of A. The results are shown in Table 2.

Example 7

Manufacture of the Liquid Storage Member for Coating Tools

A liquid storage member was manufactured in a manner similar to Example 2, except that the coated paper was wound overlapping a contact portion of 1 mm, instead of butting each other at the adjacent portion. The liquid storage member was expressed as a paper tube 7.

Evaluation of the Liquid Storage Member for Coating Tools

The measurement of the volatile loss, the bending test and the ink leakage test were carried out in a manner similar to Example 1.

The paper tube 7 had a volatile loss of 0.28%, a bending strength of 2.5 N and a result of ink leakage test of A. The results are shown in Table 2.

Example 8

Manufacture of the Liquid Storage Member for Coating Tools

A liquid storage member was manufactured in a manner similar to Example 2, except that the contact portion of the pasted paper and that of the coated paper were arranged apart from each other not by 3 mm but by 5 mm. The liquid storage member was expressed as a paper tube 8.

Evaluation of the Liquid Storage Member for Coating Tools

The measurement of the volatile loss, the bending test and the ink leakage test were carried out in a manner similar to Example 1.

The paper tube 8 had a volatile loss of 0.31%, a bending strength of 2.1 N and a result of ink leakage test of A. The results are shown in Table 2.

TABLE 2

|  | Ex. 3 | Ex. 4 | Ex. 5 | Ex. 6 | Ex. 7 | Ex. 8 |
| --- | --- | --- | --- | --- | --- | --- |
| Paper Tube | 3 | 4 | 5 | 6 | 7 | 8 |
| Coating Liquid | 2 | 3 | 1 | 1 | 1 | 1 |
| Volatile Loss (%) | 5.59 | 4.16 | 0.42 | 0.79 | 0.28 | 0.31 |
| Bending Strength (N) | 2.5 | 2.5 | 2.2 | 2.2 | 2.5 | 2.1 |
| Ink Leakage | A | A | A | A | A | A |

REFERENCE SIGNS LIST

10 liquid storage member for coating tools
11 joint
12 ballpoint pen tip
1 inner layer
2 intermediate layer
3 outer layer
4, 4' seam
5 adhesive layer

The invention claimed is:

1. A liquid storage member for coating tools having at least three layers of: a paper base laminate composed of an inner layer made of paper base material and an intermediate layer of a metal layer or a silica vapor deposition layer formed on the outer surface side of the inner layer, and an outer layer made of the paper base material formed on the outer surface side of the intermediate layer;
having structures in which the paper base laminate is spirally wound, and the outer layer made of the paper base material is spirally wound around the outer surface side of the intermediate layer; and
having a polyolefin resin-containing adhesive layer at least either between the inner layer and the intermediate layer or between the intermediate layer and the outer layer.

2. The liquid storage member for coating tools according to claim 1, wherein the paper base laminate has a length of 4 to 20 mm in the width direction.

3. The liquid storage member for coating tools according to claim 1, wherein the paper base material of the inner layer has a density of 0.8 g/cm$^3$ or more.

4. The liquid storage member for coating tools according to claim 1, wherein the paper base material of the inner layer is glassine paper, parchment paper, or vulcanized fiber.

5. The liquid storage member for coating tools according to claim 1, having structures in which in the lengthwise direction of the liquid storage member for coating tools,
the paper base laminate is spirally wound for the adjacent portions to come into contact but not to be overlapped with each other, and
the outer layer made of the paper base material is spirally wound for the adjacent portions to come into contact with each other.

6. The liquid storage member for coating tools according to claim 1, having two or more of the paper base laminates.

7. The liquid storage member for coating tools according to claim 1, wherein the contact portion of the paper base laminate and the contact portion of the outer layer made of the paper base material are arranged apart by 1 mm or more and a half or less of the width of the paper base laminate or the outer layer made of the paper base material in the lengthwise direction of the liquid storage member for coating tools.

8. The liquid storage member for coating tools according to claim 1, being a paper refill for a writing tool.

9. The liquid storage member for coating tools according to claim 2, wherein the paper base material of the inner layer has a density of 0.8 g/cm$^3$ or more.

10. The liquid storage member for coating tools according to claim 2, wherein the paper base material of the inner layer is glassine paper, parchment paper, or vulcanized fiber.

11. The liquid storage member for coating tools according to claim 2, having structures in which in the lengthwise direction of the liquid storage member for coating tools,
the paper base laminate is spirally wound for the adjacent portions to come into contact but not to be overlapped with each other, and
the outer layer made of the paper base material is spirally wound for the adjacent portions to come into contact with each other.

12. The liquid storage member for coating tools according to claim 2, having two or more of the paper base laminates.

13. The liquid storage member for coating tools according to claim 2, wherein the contact portion of the paper base laminate and the contact portion of the outer layer made of the paper base material are arranged apart by 1 mm or more and a half or less of the width of the paper base laminate or the outer layer made of the paper base material in the lengthwise direction of the liquid storage member for coating tools.

14. The liquid storage member for coating tools according to claim 2, being a paper refill for a writing tool.

\* \* \* \* \*